United States Patent [19]
Caravella et al.

[11] Patent Number: 6,089,542
[45] Date of Patent: Jul. 18, 2000

[54] FOOT-OPERATED FLUSHING SYSTEM

[75] Inventors: Gregory P. Caravella; Thomas A. Caravella, both of Somers; Jeffrey S. Tingley, Enfield, all of Conn.

[73] Assignee: CCT Company, Inc.

[21] Appl. No.: 09/208,331

[22] Filed: Dec. 9, 1998

[51] Int. Cl.[7] .................................................. F16K 31/00
[52] U.S. Cl. ............................. 251/295; 4/308; 251/294
[58] Field of Search ...................... 4/249, 308, 405, 4/310; 251/57, 294, 295

[56] References Cited

U.S. PATENT DOCUMENTS

| | | | |
|---|---|---|---|
| 3,117,761 | 1/1964 | Billeter | 251/57 |
| 3,406,940 | 10/1968 | Kertell | 4/249 |
| 3,594,828 | 7/1971 | Seek | 4/310 X |
| 3,594,829 | 7/1971 | Seek | 4/310 X |
| 4,847,924 | 7/1989 | Samaniego . | |
| 4,868,931 | 9/1989 | Schneeweiss . | |
| 5,142,708 | 9/1992 | Johnson et al. . | |

*Primary Examiner*—Charles E. Phillips

[57] ABSTRACT

A system for the remote operation of a flush valve employs a foot-pedal that is connected by a cable to an integrated drive bar, which is in turn disposed to engage the plunger of a standard flush valve actuator. Force on the pedal causes the drive bar to depress the plunger, thereby extending its tail portion into operative contact with the actuating element with the automatic valve.

23 Claims, 3 Drawing Sheets

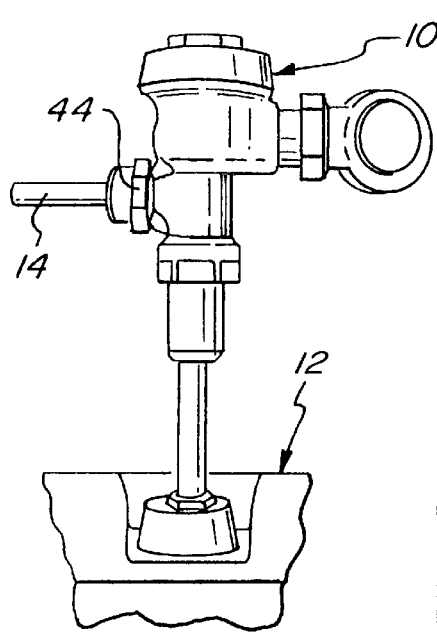
FIG. 1
(PRIOR ART)
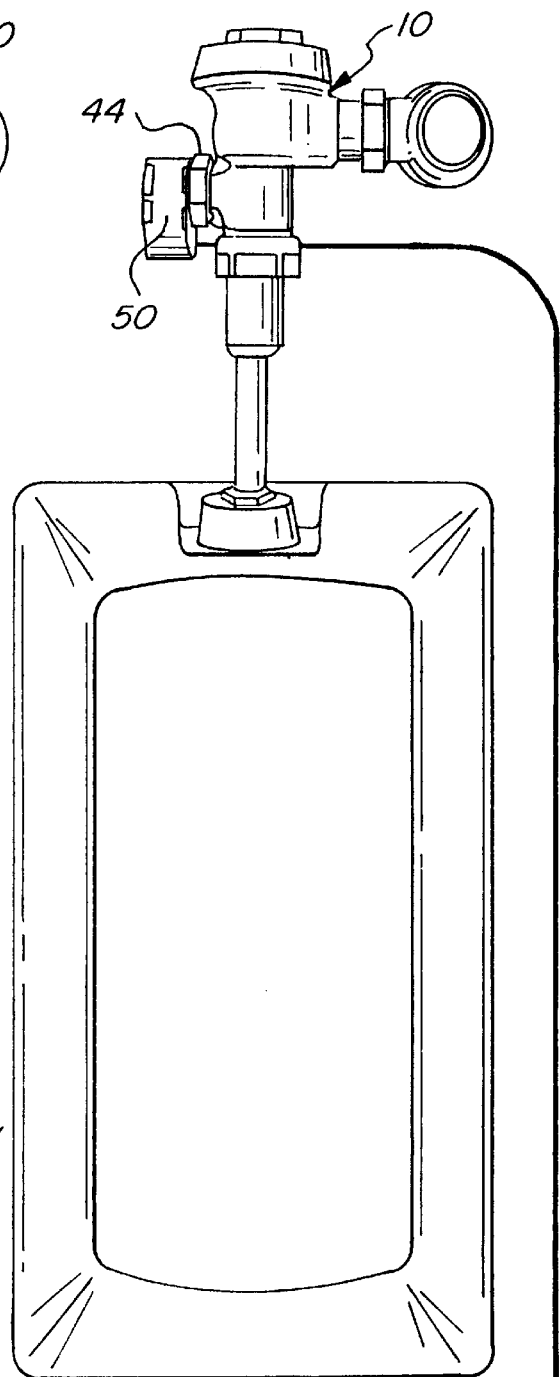
FIG. 2
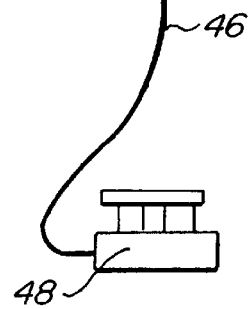

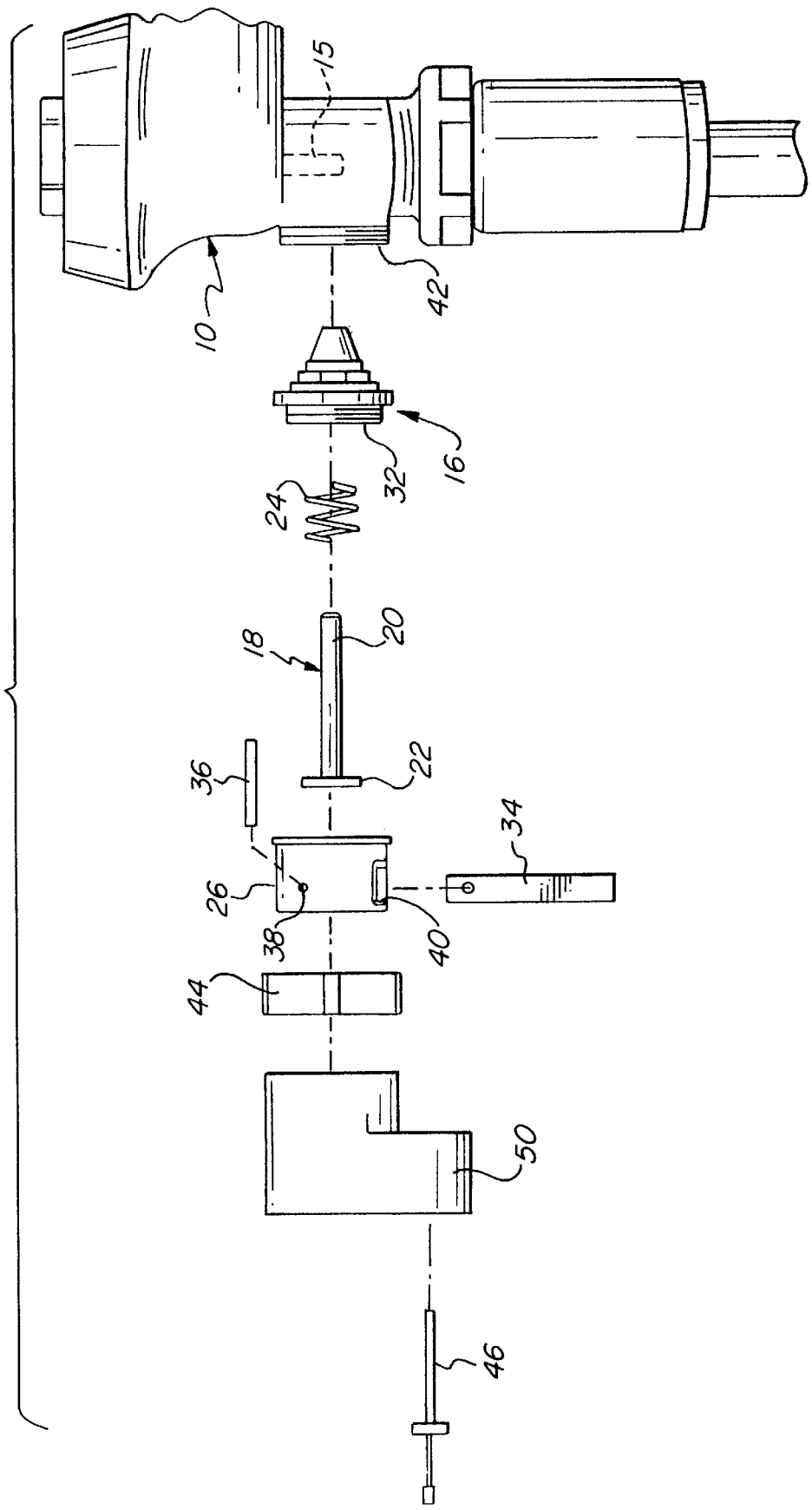

FOOT-OPERATED FLUSHING SYSTEM

BACKGROUND OF THE INVENTION

The prior art recognizes the desirability of providing foot-operated mechanisms for effecting flushing of urinals and other toilets. For example, Samaniego U.S. Pat. No. 4,847,924 discloses a toilet flushing mechanism comprised of a member that is disposed over the flush handle and is brought into engagement therewith by operation of a foot pedal.

The apparatus of Schneeweiss U.S. Pat. No. 4,868,931 includes a bracket assembly that is secured to the flush valve handle and is operatively connected to a foot lever, and in the arrangement described in Johnson et al. U.S. Pat. No. 5,142,708, the flushing handle of a toilet is connected to a foot lever by a chain linkage.

These and other arrangements taught in the art typically suffer from one or more significant disadvantages. They are often unattractive, expensive, difficult to install, inconvenient to use, and subject to tampering, vandalism, or undue maintenance requirements.

SUMMARY OF THE INVENTION

Accordingly, it is the broad object of the present invention to provide a novel system for the remote operation of an automatic flush valve and, in particular, for foot operation of the valve actuator.

A more specific object of the invention is to provide such a system which can be installed readily and unobtrusively, and which enables substantial latitude in locating and positioning the foot-pedal or other operating device.

Another object of the invention is to provide such a system which utilizes available components of standard flushing mechanisms, with only minor modification, and which thereby facilitates installation, minimizes conversion costs, and preserves the desirable functional and aesthetic features of the existing unit.

Additional specific objects of the invention are to provide a novel system for the remote operation of a flush valve, in which system adapting components can be integrated into an existing valve mechanism to thereby enhance the reliability and attractiveness of the unit while also discouraging tampering and vandalism.

It has now been found that the foregoing and related objects of the present invention are attained by the provision of a system for the remote operation of a flush valve, which system includes an actuator assembly, a mounting assembly, and an operating assembly. The actuator assembly includes a body having inner and outer opposite end portions and first engaging means, an actuating member comprising a head portion and a tail portion, and biasing means, the head portion of the actuating member being accessible for contact from adjacent the outer end portion of the body. The actuating member is mounted in the body for movement between an extended position, in which the tail portion of the member is remote from the inner end portion of the body, and a position retracted therefrom toward which it is urged by the biasing means.

The mounting assembly of the systems includes a collar piece having a sidewall portion defining an axial opening, second engaging means for engaging the body of the actuator assembly to mount the body with its outer end portion disposed within the axial passage of the collar piece, and third engaging means for operatively mounting the mounting assembly on the valve housing. With the assembly so mounted, the tail portion of the actuating member lies adjacent the water flow-initiating element of the flush valve and is disposed for operative engagement therewith, to initiate water flow, in the extended position of the actuating member. The mounting assembly also includes an elongate drive member that has opposite end portions operatively engaged in the sidewall portion of the collar piece, and an intermediate portion that substantially spans the collar piece opening transaxially and is disposed adjacent the outer end portion of the actuator assembly body for operative contact with the head portion of the actuating member. The drive member is pivotable, or otherwise movable, to displace its intermediate portion generally in the direction of movement of the actuating member, and at least one of the end portions of the drive member will usually extend laterally outwardly of the sidewall portion of the collar piece for engagement with a connecting member.

The operating assembly includes a manual operating device (normally a foot pedal), located remotely from the flush valve, and a connecting member (normally a cable) that is engaged with the "one" end portion of the drive member and is operatively connected to the manual operating device. Operation of the operating device causes the connecting member to effect movement of the drive member so as to bring its intermediate portion into contact with the head portion of the actuating member, which in turn causes the extended tail portion to deflect the flow-initiating element of the flush valve.

The actuating member will normally take the form of a plunger comprised of a rectilinear shaft, providing the tail portion at one end, and an enlarged head at the opposite end. The sidewall portion of the collar piece will desirably be formed with a lateral passage to accommodate extension of the end portion of the elongate drive member therethrough, and the collar piece will most preferably include structure for pivotably supporting the opposite end portion of the elongate drive member; more specifically, the drive member may be a bar or rod, pivotably supported by an axle piece engaged in the sidewall portion of the collar piece, to function as a lever acting upon the head of the actuating plunger.

In certain embodiments the mounting assembly will include a cover component that is dimensioned and configured to seat upon the collar piece and to substantially enclose the collar piece as well as the "one" end portion of the drive member. The actuator assembly may further include auxiliary actuating means, for use in operating the flow-initiating element of the flush valve as an alternative to using the manual operating device. Such auxiliary actuating means will include an operating portion, disposed for manual access, and a drive portion disposed for operative contact with the head portion of the actuating member.

BRIEF DESCRIPTIONS OF THE DRAWINGS

FIG. 1 is a front elevational view of a standard hand-operated flush valve unit installed on a urinal, fragmentarily illustrated;

FIG. 2 is a similar view showing the system of the present invention, so installed;

FIG. 5 is an exploded elevational view depicting the system of the invention in association with a conventional flush valve unit.

DETAILED DESCRIPTION OF THE PREFERRED AND ILLUSTRATED EMBODIMENTS

Turning initially to FIG. 1 of the drawings, therein illustrated is a standard automatic flush valve unit (e.g., a FLUSHOMETER), generally designated by the numeral 10, installed for operative association with a urinal, generally designated by the numeral 12. As will be noted, the flush unit 10 is fitted with a conventional operating handle 14, which can be pivoted universally about is base to effect flushing.

Figure 3:
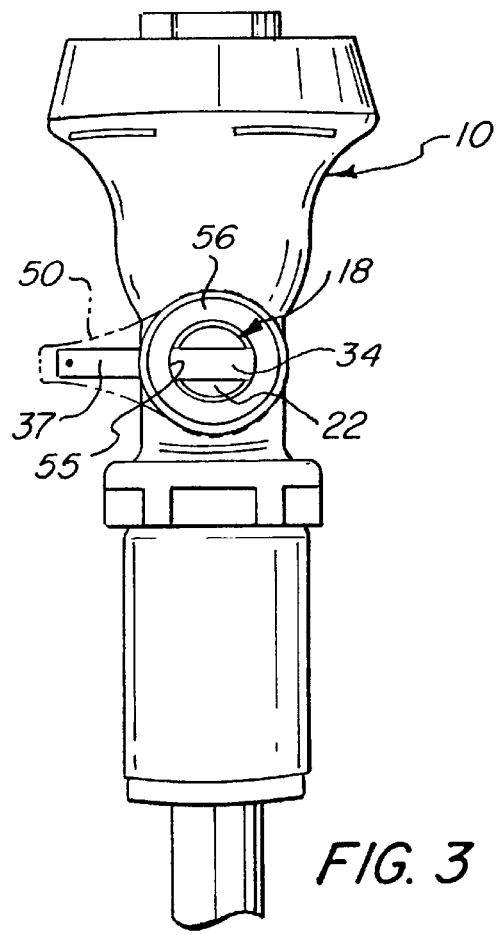
FIG. 3 is a side elevational view of the system of FIG. 2, drawn to an enlarged scale.
Figure 4:
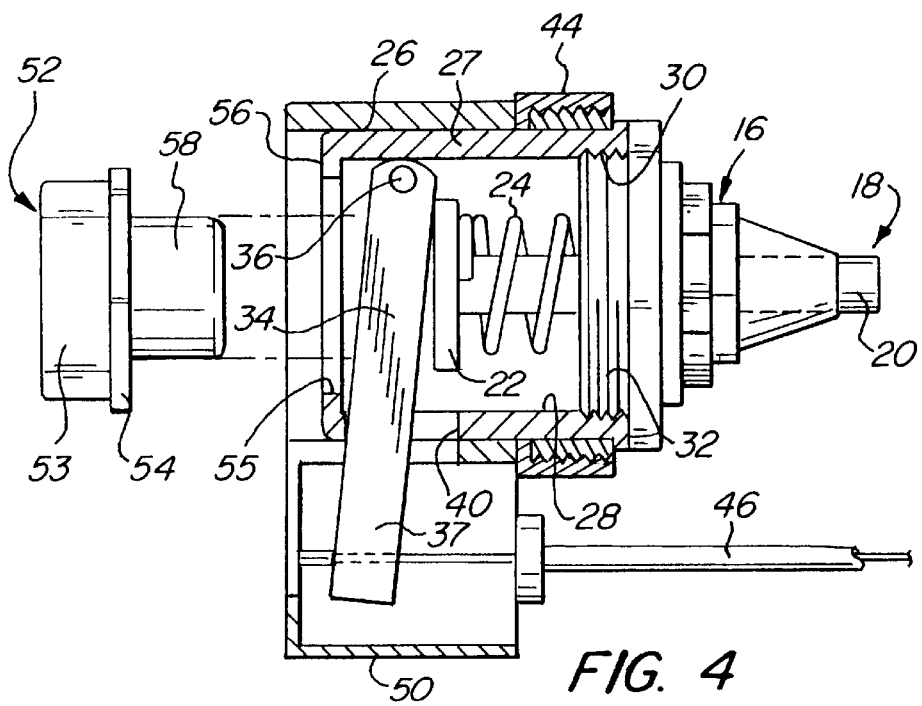
FIG. 4 is an elevational view, in partial cross section and drawn to a further enlarged scale, showing the operating components of the instant system.

The valve actuating mechanism, seen in FIGS. 3 through 5, includes a body, generally designated by the numeral 16 and of generally circular cross section, in which is slidably seated a coaxial plunger, generally designated by the numeral 18 and including a tail portion 20 at one end and a head portion 22 at its opposite end. A coil spring 24 is interposed between the body 16 and the head portion 22 to bias the plunger rearwardly, toward a retracted position of the tail portion 20.

An open-ended, generally cylindrical handle sleeve, or collar piece 26, includes a sidewall that defines a passage 28; an internally threaded portion 30 circumscribes the mouth of the sidewall portion at its forward end and engages the mating threaded portion 32 on the body 16, thus coaxially mounting the body 16 with the head portion 22 of the plunger 18 disposed within the passage 28. A drive bar or rod 34 is pivotably mounted at one end on a pin 36, which extends chordally across the passage 28 and has its opposite ends engaged in apertures 38 formed through the sidewall portion 27. An intermediate portion of the bar 34 is disposed adjacent the head portion 22 of the plunger 18, and its free end portion 37 projects through the lateral sidewall slot 40. A large nut 44 is disposed on the collar piece 26 to engage the threaded portion 42 surrounding the lateral opening into the housing of the valve 10, so as to mount the assembly thereupon. With the assembly so mounted, the tail portion 20 of the plunger 18 is aligned to contact and deflect the depending actuating element 15 of the automatic valve contained within the housing 10, to thereby actuate the valve and effect water flow.

One end of a cable 46 (typically of stainless steel) is connected to the free, projecting end portion 37 of the operating bar 34; the opposite end of the cable 46 is connected to a pedal device 48, with the intermediate portion passing behind the valve housing and running against the building wall unobtrusively along the side of the urinal 12. To enhance the aesthetics of the unit a cover 50 is frictionally engaged upon the sidewall portion 27 of the collar piece 26, to enclose, and thereby to at least substantially hide, the actuating mechanism and the cable connection.

The manner of operation will be self evident. When the foot pedal 48 is depressed the resulting tension on the cable 46 causes the drive bar 34 to pivot in the counter-clockwise direction (as the mechanism is depicted in FIG. 4). This brings the intermediate portion of the bar into engagement with the head portion 22, urging the piston 18 inwardly and thereby extending the tail portion 20 forwardly against the actuating element 15 of the valve.

A manual override for the foot-operated lever arrangement may optionally be provided. As depicted in FIG. 4, for example, a push-button actuator, generally designated by the numeral 52, has a knob portion 53 at one end, a pair of spaced legs 58 at the other end, and a projecting annular flange 64 interposed therebetween. The actuator 52 is dimensioned and configured to seat within the opening 55 at the outer end of the collar piece passage 28, with the knob 53 protruding therethrough and with the flange 54 engaged under the circumferential lip 56 by which the opening 55 is defined. A bifurcating slot (not seen) between the legs 58 (only one of which is visible) permits the legs 58 to straddle and traverse the bar 34, to engage the head 22 and thereby to shift the piston 18. Inward force upon the button 52 will of course depress the piston 18 and bring its tail portion 20 into engagement with the valve actuating element 15, as previously described.

It will be appreciated that many variations can be made in the system of the invention without departure from the concepts described and claimed herein. Not only may other placements of the cable 46 and foot pedal (or other operating device) be employed, but indeed it may be most desirable, from an aesthetic standpoint, to "snake" the cable through the wall to substantially hide it from sight; functionally equivalent connecting means, such as an arrangement of links and joints, can of course be substituted for the cable if so desired. Although installation into a valve associated with a urinal has been depicted, it is self-evident that the system described is equally well suited for installation with other toilet units (or indeed with any suitable valve, irrespective of the particular function that it is to serve).

A particularly notable advantage of the present invention resides however in its ability to utilize many of the existing parts of standard valve constructions, not only to thereby facilitate retrofitting but also to minimize costs and optimize the security and appearance of the completed unit. As described hereinabove, the only parts that are added to the standard actuating mechanism, other than the foot-pedal/cable arrangement and the enclosing cover piece, are the drive bar 34 and its mounting pin 36. The collar piece 26 is, as noted above, a standard handle sleeve (which normally serves to mount the operating handle 14), which is readily modified to accommodate the mechanism of the invention by forming thereinto chordally aligned apertures 38 (for the pivot pin 36) and the lateral slot 40 (for the projecting bar portion 37). Despite this advantage, it will be appreciated that the present system may be implemented as an OEM feature, and that components of the standard valve assembly may be replaced, as appropriate, if so desired.

Thus, it can be seen that the present invention provides a novel system for the remote operation of an automatic flush valve and, in particular, for foot operation of the value actuator. The system can be installed readily and unobtrusively, and it enables wide latitude in locating and positioning of the foot-pedal or other operating device. The system can employ available components of standard flushing mechanisms, with only minor modification, and thereby facilitates installation, minimizes costs for conversion, and preserves desirable functional and aesthetic features of the existing unit. Particular advantage derives from the avoidance of any connection to, or adaptation of, the existing operating handle, with the drive elements instead replacing the handle and being integrated internally into the valve unit. The resulting system is highly reliable, aesthetically appealing, resistant to tampering and vandalism, and requires little maintenance.

Having thus described the invention, what is claimed is:

1. A system for the remote operation of a flush valve contained within a valve housing, the flush valve including an element that is deflectable for initiating water flow, said system comprising:

an actuator assembly including a body having inner and outer opposite end portions, and first engaging means on said body; an actuating member comprising a head portion and a tail portion at opposite ends thereof, said actuating member being mounted in said body for movement between an extended position, with said tail portion of said actuating member remote from said inner end portion of said body, and a retracted position with said tail portion proximate said inner end portion, said head portion being accessible for contact from adjacent said outer end portion of said body; and biasing means for urging said actuating member toward said retracted position thereof;

a mounting assembly including a collar piece having a sidewall portion defining an axial opening therewithin, second engaging means for engaging said body of said actuator assembly to mount said body with said outer end portion thereof disposed within said axial passage of said collar piece, and third engaging means for operatively mounting said mounting assembly on the valve housing with said tail portion of said actuating member adjacent the deflectable, water flow-initiating element of the flush valve for operative engagement therewith, to initiate water flow, in said extended position of said actuating member; and a drive member having opposite end portions, said drive member being operatively engaged in said sidewall portion of said collar piece, and having an intermediate drive portion substantially spanning said opening transaxially and disposed adjacent said outer end portion of said body for operative contact with said head portion of said actuating member, said drive member being movable to displace said drive portion thereof within said collar piece opening generally in the direction of movement of said actuating member, one of said end portions of said drive member extending laterally outwardly of said sidewall portion of said collar piece for engagement with a connecting member, and the other of said opposite end portions of said drive member being operatively supported by said sidewall portion for pivotal movement; and an operating assembly including a manual operating device located remotely from the flush valve; and a connecting member engaged with said one end portion of said drive member and so operatively connecting said manual operating device thereto that, upon operation of said operating device said connecting member will effect pivotable movement of said drive member so as to displace said drive portion thereof generally inwardly, and will in turn move said actuating member to its extended position by contact with said head portion thereof, thereby operatively deflecting the flow-initiating element of the flush valve.

2. The system of claim 1 wherein said first and second engaging means comprise mated circumferential threaded portions, and wherein said actuating member is a plunger comprised of a rectilinear shaft, providing said tail portion at one end, and an enlarged head providing said head portion at the opposite end of said shaft.

3. The system of claim 1 wherein said sidewall portion of said collar piece is formed with a lateral passage through which said at least one end portion of said drive member extends.

4. The system of claim 1 wherein said drive member comprises a bar, and wherein said structure for pivotably supporting comprises an axle piece engaged in said sidewall portion of said collar piece, said other end portion of said bar being pivotably supported on said axle piece.

5. The system of claim 1 wherein said operating device comprises a depressible pedal.

6. The system of claim 5 wherein said connecting member comprises a flexible cable.

7. The system of claim 1 wherein said mounting assembly further includes a cover component dimensioned and configured to seat upon said collar piece and to substantially enclose said collar piece and said one end portion of said drive member.

8. The system of claim 1 wherein said actuator assembly further includes auxiliary actuating means having an operating portion disposed for manual access and a drive element disposed for operative contact with said head portion of said actuating member, wherein the flow-initiating element of the flush valve can be operated by use of said auxiliary actuating means as an alternative to use of said manual operating device.

9. The system of claim 1 wherein said drive member comprises a bar.

10. The system of claim 1 wherein said operating device comprises a depressible pedal.

11. The system of claim 10 wherein said connecting member comprises a flexible cable.

12. The system of claim 1 wherein said mounting assembly further includes a cover component dimensioned and configured to seat upon said collar piece and to substantially enclose said collar piece and said one end portion of said drive member.

13. The system of claim 1 wherein said actuator assembly further includes auxiliary actuating means having an operating portion disposed for manual access and a drive element disposed for operative contact with said head portion of said actuating member, wherein the flow-initiating element of the flush valve can be operated by use of said auxiliary actuating means as an alternative to use of said manual operating device.

14. A system for the remote operation of a flush valve contained within a valve housing, the flush valve including an element that is deflectable for initiating water flow, said system comprising:

an actuator assembly including a body having inner and outer opposite end portions, and first engaging means on said body; an actuating member comprising a head portion and a tail portion at opposite ends thereof, said actuating member being mounted in said body for movement between an extended position, with said tail portion of said actuating member remote from said inner end portion of said body, and a retracted position with said tail portion proximate said inner end portion, said head portion being accessible for contact from adjacent said outer end portion of said body; and biasing means for urging said actuating member toward said retracted position thereof;

a mounting assembly including a collar piece having a sidewall portion defining an axial opening therewithin, second engaging means for engaging said body of said actuator assembly to mount said body with said outer end portion thereof disposed within said axial passage of said collar piece, and third engaging means for operatively mounting said mounting assembly on the valve housing with said tail portion of said actuating member adjacent the deflectable, water flow-initiating element of the flush valve for operative engagement therewith, to initiate water flow, in said extended position of said actuating member; and a drive member having opposite end portions, said drive member being operatively engaged in said sidewall portion of said collar piece, and having an intermediate drive portion substantially spanning said opening transaxially and disposed adjacent said outer end portion of said body for operative contact with said head portion of said actuating member, said drive member being movable to displace said drive portion thereof within said collar piece opening generally in the direction of movement of said actuating member, at least one of said end portions of said drive member extending laterally outwardly of said sidewall portion of said collar piece for engagement with a connecting member; and an operating assembly including a manual operating device located remotely from the flush valve; and a connecting member engaged with said one end portion of said drive member and so operatively connecting said manual operating device thereto that, upon operation of said operating device said connecting member will effect movement of said drive member so as to displace said drive portion thereof generally inwardly, and will in turn move said actuating member to its extended position by contact with said head portion thereof, thereby operatively deflecting the flow-initiating element of the flush valve.

15. The system of claim 14 wherein said first and second engaging means comprise mated circumferential threaded portions, and wherein said actuating member is a plunger comprised of a rectilinear shaft, providing said tail portion at one end, and an enlarged head providing said head portion at the opposite end of said shaft.

16. The system of claim 14 wherein said sidewall portion of said collar piece is formed with a lateral passage through which said at least one end portion of said drive member extends.

17. A system for the remote operation of a flush valve contained within a valve housing, the flush valve including an element that is deflectable for initiating water flow, said system comprising:

an actuator assembly including a body having inner and outer opposite end portions, and first engaging means on said body; an actuating member comprising a head portion and a tail portion at opposite ends thereof, said actuating member being mounted in said body for movement between an extended position, with said tail portion of said actuating member remote from said inner end portion of said body, and a retracted position with said tail portion proximate said inner end portion, said head portion being accessible for contact from adjacent said outer end portion of said body; and biasing means for urging said actuating member toward said retracted position thereof;

a mounting assembly including a collar piece having a sidewall portion defining an axial opening therewithin, second engaging means for engaging said body of said actuator assembly to mount said body with said outer end portion thereof disposed within said axial passage of said collar piece, and third engaging means for operatively mounting said mounting assembly on the valve housing with said tail portion of said actuating member adjacent the deflectable, water flow-initiating element of the flush valve for operative engagement therewith, to initiate water flow, in said extended position of said actuating member; and a drive member having opposite end portions, said drive member being operatively engaged in said sidewall portion of said collar piece, and having an intermediate drive portion substantially spanning said opening transaxially and disposed adjacent said outer end portion of said body for operative contact with said head portion of said actuating member, said drive member being movable to displace said drive portion thereof within said collar piece opening generally in the direction of movement of said actuating member, one of said end portions of said drive member being accessible for engagement with a connecting member, and the other of said opposite end portions of said drive member being operatively supported by said sidewall portion of said collar piece for pivotal movement; and an operating assembly including a manual operating device located remotely from the flush valve; and a connecting member engaged with said one end portion of said drive member and so operatively connecting said manual operating device thereto that, upon operation of said operating device said connecting member will effect pivotal movement of said drive member so as to displace said drive portion thereof generally inwardly, and will in turn move said actuating member to its extended position by contact with said head portion thereof, thereby operatively deflecting the flow-initiating element of the flush valve.

18. The system of claim 17 wherein said first and second engaging means comprise mated circumferential threaded portions, and wherein said actuating member is a plunger comprised of a rectilinear shaft, providing said tail portion at one end, and an enlarged head providing said head portion at the opposite end of said shaft.

19. The system of claim 17 wherein said drive member comprises a bar, and wherein said structure for pivotably supporting comprises an axle piece engaged in said sidewall portion of said collar piece, said other end portion of said bar being pivotably supported on said axle piece.

20. The system of claim 17 wherein said operating device comprises a depressible pedal.

21. The system of claim 20 wherein said connecting member comprises a flexible cable.

22. The system of claim 17 wherein said mounting assembly further includes a cover component dimensioned and configured to seat upon said collar piece and to substantially enclose said collar piece and said one end portion of said drive member.

23. The system of claim 17 wherein said actuator assembly further includes auxiliary actuating means having an operating portion disposed for manual access and a drive element disposed for operative contact with said head portion of said actuating member, wherein the flow-initiating element of the flush valve can be operated by use of said auxiliary actuating means as an alternative to use of said manual operating device.

* * * * *